United States Patent [19]

Aubert

[11] 3,773,683

[45] Nov. 20, 1973

[54] NOVEL SUSPENDING AGENT COMPOSITION FOR USE IN POWDER AEROSOL COMPOSITIONS AND PROCESS FOR PREPARATION

[75] Inventor: Lawrence Joseph Aubert, Cincinnati, Ohio

[73] Assignee: The Procter & Gamble Company, Cincinnati, Ohio

[22] Filed: Jan. 11, 1972

[21] Appl. No.: 216,991

[52] U.S. Cl................................. 252/305, 424/46
[51] Int. Cl............................................. C09k 3/30
[58] Field of Search...................... 424/46; 252/305, 252/163, 385, 351

[56] References Cited
UNITED STATES PATENTS

| | | | |
|---|---|---|---|
| 2,499,002 | 2/1950 | Robinson | 252/351 |
| 2,885,360 | 5/1959 | Haden et al. | 252/163 |
| 3,218,263 | 11/1965 | Boyle | 252/305 |

*Primary Examiner*—John D. Welsh
*Attorney*—Richard C. Witte et al.

[57] ABSTRACT

A process for the preparation of a propellant containing suspending agent composition having enhanced suspension properties for use in powder aerosol compositions, which process comprises combining a bulking agent selected from the group consisting of montmorillonite clays and hydrophobically treated montmorillonite clays with a propellant and subjecting said combination to high shear mixing until the bulking agent is uniformly dispersed, and the propellant containing suspending agent composition prepared by said process.

9 Claims, No Drawings

1

NOVEL SUSPENDING AGENT COMPOSITION FOR USE IN POWDER AEROSOL COMPOSITIONS AND PROCESS FOR PREPARATION

BACKGROUND OF THE INVENTION

1. Field of the Invention

Aerosol systems per se are not new, the first record of such a system being recorded as early as the late 1800's. Since the introduction of the early aerosol systems, a variety of aerosol systems have been developed which have resulted in numerous aerosol consumer products.

Of the aerosol systems which have appeared on the market since the time aerosol containers became commercially feasible, one such aerosol system which has become extremely popular in recent years is the powder aerosol, which basically consists of a suspension of powdered materials in one or more liquefied propellants. While it is generally conceded that the powder suspension aerosol offers a great many advantages over solution or foam type aerosol products and has met with a moderate degree of commercial success, it is also recognized that many problems are associated with the use of this type of aerosol product.

Foremost of the problems associated with the powder aerosol compositions is the agglomeration and settling of the suspended powder particles. This phenomena most often occurs immediately after the suspension is prepared or within a short period of time thereafter. This agglomeration, or clumping together and settling of the powder particles, causes difficulty of redispersion, valve clogging, and uneven distribution of the powder to the desired surface.

While the effects of agglomeration and settling can be remedied to some extent by shaking the aerosol container prior to use, this is not a satisfactory solution to the problem, since surveys indicate that many aerosol users do not adequately shake or fail to shake the containers prior to use.

Some advantages attributed to the use of powder aerosols, apart from convenience, are: Making possible the spraying of powders evenly and economically onto a required area uniformly with a minimum of waste, e.g., antiperspirants, baby powders, foot powders, etc.; ease of application to otherwise inaccessible or difficult-to-reach areas; lack of exposure to bacterial contamination, thereby allowing the preparation of sterile products; and protection from atmospheric deterioration due to humidity or oxidation, thereby resulting in a product having an extended shelf life.

A considerable amount of work has been done in an attempt to remedy the aforementioned problems including the utilization of bulking or suspending agents to assist in filling the void space between suspended particles, the introduction of materials into the suspension for the purpose of providing slippage between particles and to lubricate the component parts of the aerosol valve, and the regulation of particle size, depending upon the nature of the powder suspensoid. While this work has improved the stability of powder aerosol products to some extent, it is clear that the powder aerosol compositions currently available are still beset by the problems discussed above.

Examples of products currently being marketed in the form of a powder aerosol include antiperspirants, antiseptics, fungicides, antibiotics, insecticides, foot powders, paints, fire extinguishers, lubricants, as well as a variety of cosmetic preparations.

2. The Prior Art

There is a considerable amount of art relating to the use of clay type suspending agents in powder aerosol systems. See, for example, British Pat. 1,167,173, Spitzer et al.; U.S. Pat. No. 3,088,874 which issued on May 7, 1963 to Geary et al.; and U.S. Pat. No. 3,218,263 which issued on Nov. 16, 1965 to Boyle et al.

SUMMARY OF THE INVENTION

It has been surprisingly found that powder aerosol compositions possessing greatly improved characteristics are made possible by incorporating therein a propellant containing suspending agent composition prepared by a process which comprises combining a bulking agent selected from the group consisting of montmorillonite clays and hydrophobically treated montmorillonite clays with at least a portion of the amount of aerosol propellant utilized in the final composition, and then subjecting the combination to high shear mixing for a period of time sufficient to achieve uniform dispersion of the bulking agent. The remaining desired ingredients can then be combined to achieve the desired composition. The complete mixture can then be packaged in a suitable aerosol container, with the remainder of the desired propellant, which can be the same as or different from that used to prepare the suspending agent composition, being added in a manner known in the art.

Powder aerosol compositions utilizing the propellant containing suspending agent composition prepared by the process of the present invention possess greatly improved characteristics over similar powder aerosol compositions not containing the composition prepared in accordance with the process of the instant invention. Such improvements are evinced by significantly higher suspension levels, lower settling rates and less agglomeration, the net effect being less clogging, less button build-up, and more uniform product distribution, even when the aerosol container is not shaken well or at all. Also, in instances where there has been some settling due to nonuse over an extended period of time, powder aerosol compositions containing the suspending agent composition made by the process of the present invention are more easily redispersed by normal shaking than are products known in the art not containing the suspending agent composition disclosed herein. The process of the present invention is further advantageous in that the desired powder aerosol product can be prepared in a shorter time.

Examples of powder aerosol products that can be prepared utilizing the propellant containing suspending agent composition made by the process of the present invention include cosmetics and toiletries such as antiperspirants, baby dusting powders, bronzant powder creams, deodorants, dry shampoos, denture powders (cleaners and adhesives), eye shadow, hair sprays containing powder tints, intimate hygiene powders, rouge, sun barriers, talc sprays (and variations thereof such as for athletic and sports use), tinted foundation creams, and toothpastes, medical and pharmaceutical products, such as calamine lotions, nasal and oral inhalation sprays, and topical sprays, food aerosols such as colored sprays for cake, and marzipan decoration, spice sprays, and a variety of miscellaneous aerosol powder products such as car polishes, diamond powder grinding systems, fabric cleaners, flaw detection powder sprays, fire extinguishers, lacquers (metallic tinted), lubricating sprays (e.g., graphite based), paint sprays, window cleaners, and bathroom disinfectant abrasive powders.

While not all of the above listed products produce dry powders when dispensed, nevertheless, they are powder aerosols even if they are not powder sprays.

DETAILED DESCRIPTION OF THE INVENTION

In its broadest aspect, the present invention relates to a process for the preparation of a propellant containing suspending agent composition for use in powder aerosol compositions, which process comprises:
  A. Combining in a suitable container:
    1. from about 0.1 percent to about 3 percent of a bulking agent selected from the group consisting of montmorillonite clays and hydrophobically treated montmorillonite clays; and
    2. the balance, an anhydrous liquefiable non-toxic propellant selected from the group consisting of non-halogenated hydrocarbons, fluorohydrocarbons and chlorofluorohydrocarbons and mixtures thereof; and
  B. Subjecting said combination to high shear mixing for a period of time sufficient to achieve a uniform dispersion of the bulking agent.

In addition to the above ingredients combined in step (A) above, a preferred embodiment of the present invention includes in step (A), (3) a polar liquid selected from the group consisting of ethanol, methanol and propylene carbonate. Said polar additive is present in a ratio of from about 0.33 – 0.45:1 of polar additive to bulking agent. When methanol (95% aqueous solution) or propylene carbonate are used, the preferred ratio is about 0.33:1.0. When ethanol (95 percent aqueous solution) is desired, the preferred ratio is about 0.45:1.

The bulking agents suitable for use in the process of the present invention are selected from the group consisting of montmorillonite clays and hydrophobically treated montmorillonite clays. Montmorillonite clays are those which contain the mineral montmorillonite and are characterized by having an expanding lattice. Examples of these clays include the bentonites, hectorites, and colloidal magnesium aluminum silicates.

Bentonite is colloidal, hydrated aluminum silicate obtained from montmorillonite and has the formula $Al_2O_34SiO_2{\cdot}H_2O$. A more detailed discussion of bentonites can be found in the Kirk-Othmer Encyclopedia of Chemical Technology, 2nd Edition, Vol. 3, (1964) pp. 339–360, published by Interscience Publishers, which is incorporated herein by reference.

Hectorite, also a montmorillonite clay, differs from bentonite in that there is almost a complete substitution of aluminum in the lattice structure of bentonite by magnesium and in addition, the presence of lithium and fluorine.

The magnesium aluminum silicates are complexes of colloidal magnesium aluminum silicate richer in magnesium than aluminum. Magnesium aluminum silicates are commercially available as Veegum (R. T. Vanderbilt Co.).

Preferred bulking agents for use in the present invention are certain hydrophobically treated montmorillonite clays, e.g., hydrophobic bentonites available under the trade-name of "Bentone." Bentone is prepared by reacting bentonite in a cation exchange system with an amine. Different amines are reacted to obtain a variety of Bentones, which may also differ in proportions of $SiO_2$, $MgO$ and $Al_2{\cdot}O_3$. Specific examples of Bentones within the scope of the present invention are Bentone-38, Bentone-34, Bentone-27, Bentone-14, and Bentone-LT, all of which have a particle size of below about 5 microns and are commercially available from the National Lead Company. Bentone-38 is most preferred.

The propellant containing suspending agent composition made by the process of the present invention contains from about 0.1 percent to about 3 percent by weight of the bulking agent, preferably about 1.5 percent by weight. Below about 0.1 percent the composition formed by the process of the present invention loses some of its desirable suspension enhancing properties, while the use of bulking agents in the present process in amounts greater than about 3 percent results in a composition that is too thick and has diminished enhancement characteristics.

While not critical to the present process, it is preferred to utilize a polar liquid to aid in obtaining maximum dispersion efficacy. Examples of preferred polar additives include methanol (95 percent aqueous solution), ethanol (95% aqueous solution) and propylene carbonate. Ethanol is most preferred in a ratio of about 0.45:1 to the amount of bulking agent present. Methanol and propylene carbonate are preferably present in a ratio of about 0.33:1 of polar additive: bulking agent.

The propellant for use in the instant invention can be any anhydrous, liquefiable, non-toxic, non-halogenated hydrocarbon, chlorofluorohydrocarbon or fluorohydrocarbon propellant known in the art. Examples of such propellants include trichloromonofluoromethane (propellant 11), dichlorodifluoromethane (propellant 12), dichlorotetrafluoroethane (propellant 114), monochlorodifluoromethane (propellant 22), monochlorodifluoroethane (propellant 142b), trichlorotrifluoroethane (propellant 113), propane, butane, isobutane, 1,1-difluoroethane, 1,1-difluoro-1-chloroethane, dichloromonofluoromethane (Freon 21), and methylene chloride, used singly or admixed. Preferred propellants for use in the process of the present invention include trichlorotrifluoroethane, dichlorotetrafluoroethane, and trichloromonofluoromethane, with trichloromonofluoromethane (propellant 11) being most preferred, primarily because of its higher boiling point. The propellant makes up the balance of the composition. The above propellants are all commercially available under a number of tradenames.

The above compounds are combined in a suitable container, the choice being governed by such factors as batch size, and whether or not the application of cooling, heat and/or pressure is desired. The combination is then subjected to mixing utilizing high shear mixing equipment. High shear mixing is necessary to effect maximum dispersion of the bulking agent in the propellant, which cannot be achieved utilizing non-shear mixing methods. The concept of shear mixing is well known in the art. A discussion of shear mixing can be found in a number of Chemical Engineering references, one of which is *Chemical Engineering*, Vol. 2, 2nd Edition by Coulson and Richardson. The term "high shear mixing" relates to a degree of shear mixing which can be accomplished utilizing a number of well known means. The degree of high shear mixing is not critical to the present invention and the compositions of the present invention can readily be achieved utilizing a variety of equipment having a range of shear mixing capacities. Examples of suitable high shear mixing equipment are shear pumps, colloid mills, shear-in-line mixers, dispersators and blenders for small-scale formulation. Shear mixing should be continued until uniform dispersion of the bulking agent is obtained. The point of maximum dispersion is achieved when a somewhat constant viscosity is reached.

The point of maximum dispersion can be measured by periodically determining the viscosity utilizing any viscosity measuring instrument such as the Brookfield Synchro-Lectric viscometer. The period of time necessary to achieve maximum dispersion varies and depends not only on the composition desired, but also on the kind of shear equipment utilized and the conditions under which the shear mixing is carried on, i.e., whether temperature and pressure are utilized. It should also be noted that the efficiency of the shearing equipment will also have a bearing on the viscosity and amount of dispersion attained. The "in-line" shear mixer has been found to be most efficient for large batch preparations.

While it is satisfactory to carry on the shear mixing utilizing open containers, it is preferred that the container also contain a cooling mechanism. This is desirable as the boiling points of some of the propellants suitable for use herein are approximately room temperature with the majority of propellants having boiling points considerably below room temperature. Cooling the mixture to below the boiling point of the propellant minimizes propellant loss due to vaporization.

The shear mixing step of the present invention can also be carried out utilizing the application of heat and pressure to the mixture in a closed vessel. The amount of heat and pressure necessary will depend on the type of propellant employed and the particular formulation desired. Selection of the proper heat/pressure conditions is readily determinable by those skilled in the art. This method, while being more complicated, aids shearing and consequently lowers the shear mixing time. The type of container used is not critical.

The resulting composition is a propellant containing suspending agent composition which, when incorporated into a powder aerosol composition as mentioned heretofore, imparts thereto greatly enhanced suspension properties.

In addition to the above essential ingredients, additional ingredients such as a particulate powder active can be incorporated with the essential and preferred compounds in step (A) above, prior to shear mixing in step (B). The nature of the additional ingredients will depend upon the desired aerosol composition. It is preferred, however, to mix the essential and preferred ingredients prior to the incorporation of additional ingredients, as total incorporation results in some loss of suspension enhancement. However, mixture of all essential and non-essential ingredients prior to shear mixing nevertheless results in an aerosol composition having enhanced suspension characteristics as will be demonstrated below.

For example, the suspending agent composition of the present invention may be utilized in a powder aerosol antiperspirant composition. Such an aerosol composition might contain in addition to the suspending agent composition a powder antiperspirant active, emollient-carrier liquids, optional additional suspending agents, antimicrobials, coloring agents, and perfumes. These ingredients either may be added in step (A) above, or subsequent to the formation of the propellant containing suspending agent composition obtained in step (B). Either way, after all of the desired ingredients are mixed together, the composition is then ready to be placed in the desired aerosol container, and subsequently filled to the desired level with a suitable propellant.

The following examples further illustrate the improved effectiveness and the preferred embodiments of the present invention. Such examples shall not be construed to be limiting, as variations of the present invention will be readily apparent to those skilled in the art.

EXAMPLE I

A suspending agent composition for use in powder aerosol compositions is prepared as follows:

1.5 grams of Bentone-38 are combined with 150 gm. of propellant 11 (trichloromonofluoromethane) in an Osterizer blender. The blender is sealed and is turned on to "liquefy" for approximately 1 minute. The resulting mixture is a uniform propellant containing suspending agent composition desirable for use in a variety of powder aerosol formulations.

EXAMPLE II

A 100 pound batch of a suspending agent composition is prepared having the following composition:

| Ingredient | Percent by Weight |
|---|---|
| Bentone-38 | 1.5 |
| Ethanol (95% aqueous solution) | 0.675 |
| Propellant 11 (trichloromonofluoromethane) | balance |

The Bentone-38, ethanol and propellant 11 are placed in an open vessel containing a cooling jacket. The vessel is connected to a Chemineer in-line mixer and the mixture shear mixed until the mixture attained is an essentially constant viscosity of about 800 cp. as measured by a Brookfield viscometer. During shearing, the vessel is cooled to about 70°F. The resulting mixture is a propellant containing suspending agent composition which will impart improved suspension characteristics to a powder aerosol composition into which it is incorporated.

The process of Example II is employed except that the Bentone-38 is replaced by equivalent amounts of other montmorillonite clays selected from the group consisting of bentonites, hectorites, and colloidal magnesium aluminum silicates; and hydrophobically treated montmorillonite clays selected from the group consisting of Bentone-34, Bentone-27, Bentone-14, and Bentone-LT. In each instance, a desirable propellant containing suspending agent composition for use with powder aerosol compositions results.

Suspending agent compositions are made in accordance with the process of Example II except that the aqueous solution of ethanol is replaced by an amount of 0.5 percent by weight propylene carbonate and methanol (95 percent aqueous solution), respectively. A desirable suspending agent composition results in each instance.

The process of Example II is utilized to prepare suspending agent compositions disclosed therein except that the propellant 11 is replaced in each case by an equivalent amount of dichlorodifluoromethane, dichlorotetrafluoroethane, monochlorodifluoromethane, monochlorodifluoroethane, trichlorotrifluoroethane, propane, butane, isobutane, 1,1-difluoroethane, 1,1-difluoro-1-chloroethane, dichloromonofluoromethane, and methylene chloride. Depending upon the particular propellant used, the mixture is cooled to below the boiling point of the respective propellant. In each case, the resulting composition is desirable for use in powder aerosol compositions and imparts greatly enhanced suspension characteristics thereto.

EXAMPLE III

A powder aerosol antiperspirant composition utilizing a propellant containing suspending agent composition was prepared as follows:

0.67 grams of distilled water were added to 12.83 grams of ethanol (SDA No. 40) to form a 95 percent aqueous solution. 1.0 gram of citric acid monohydrate was dissolved in this solution in a 50 ml. beaker. This mixture, along with 903 grams of propellant 11 (trichloromonofluoromethane), 30 grams of Bentone-38, 175 grams of dibutyl phthalate, 5 grams of hexachlorophene, 250 grams of an aluminum hydroxychloride/zirconium hydroxychloride complex (antiperspirant active), and 10 grams of perfume were placed in an Osterizer blender. The mixture was sheared in the closed blender for about 1 minute at "liquefy" speed at room temperature. 40 grams of this concentrate were then added to a Wheaton Plastic-coated glass aerosol bottle. 102 grams of propellant 11/12 (50/50) mixture were pressure filled into the bottle. The bottle was shaken. After 24 hours, the suspension height was about 50 percent.

EXAMPLE IV

A powder aerosol antiperspirant composition was prepared as follows:

1.0 gram of citric acid monohydroxide was dissolved in 13.5 grams of a 95 percent aqueous solution of ethanol in a 50 ml. beaker. 903 grams of propellant 11 (trichloromonofluoromethane), 30 grams of Bentone-38, and the above solution were put in an Osterizer blender. The blender was covered and turned to "liquefy" for about 1 minute to accomplish shear mixing. To this mixture were added 175 grams of dibutyl phthalate, 5 grams of hexachlorophene, 250 grams of a complex of aluminum hydroxychloride and zirconium hydroxychloride, and 10 grams of perfume. The blender was again turned on for about 15 seconds. 40.0 grams of this concentrate were placed in a Wheaton plastic-coated glass aerosol bottle. 102 grams of a propellant mixture 11/12 (50/50) were pressure filled into the bottle. The bottle was shaken and then allowed to set undisturbed for 24 hours. After the 24 hour period, the suspension height was about 65 percent.

EXAMPLE V

A powder aerosol antiperspirant composition utilizing a propellant containing suspending agent composition was prepared as follows:

1.0 gram of citric acid monohydrate was dissolved in 12.83 grams of ethanol (SDA No. 40) and 0.67 grams of distilled water in a 50 ml. beaker. 2.9 grams of this mixture along with 180.6 grams of propellant 11 (trichloromonofluoromethane), and 6.0 grams of Bentone-38 were placed in an Osterizer blender and the top sealed. The mixture was shear mixed by running the blender at "liquefy" for about 1 minute. 35 grams of dibutyl phthalate, 50 grams of aluminum hydroxychloride/zirconium hydroxychloride complex, 1 gram of hexachlorophene, and 2 grams of perfume were added and mixed for an additional 15 seconds. 40 grams of this concentrate were placed in a Wheaton plastic-coated aerosol container, and 102 grams of 11/12 (50/50) propellant mixture pressure filled into the bottle. The bottle was shaken and allowed to set undisturbed for 24 hours. After 24 hours, the suspension height was 80 percent.

The process of Example V is employed except that the Bentone-38 is replaced by equivalent amounts of other montmorillonite clays selected from the group consisting of bentonites, hectorites, and colloidal magnesium aluminum silicates; and hydrophobically treated montmorillonite clays selected from the group consisting of Bentone-34, Bentone-27, Bentone-14, and Bentone-LT. In each instance, the resulting powder aerosol has desirable suspension characteristics.

Powder aerosol compositions containing a propellant containing suspending agent composition are made in accordance with the process of Example V except that the aqueous solution of ethanol is replaced by propylene carbonate and methanol (95 percent aqueous solution) in an amount such that 2.0 grams are mixed with the 6.0 grams of Bentone-38. A desirable powder antiperspirant composition having enhanced suspension characteristics results.

The process of Example V is utilized except that the propellant 11 is replaced in each case by an equivalent amount of dichlorodifluoromethane, dichlorotetrafluoroethane, monochlorodifluoromethane, monochlorodifluoroethane, trichlorotrifluoroethane, propane, butane, isobutane, 1,1-difluoroethane, 1,1-difluoro-1-chloroethane, dichloromonofluoromethane, and methylene chloride. Depending upon the particular propellant used, the mixture is cooled to below the boiling point of the respective propellant. In each case, a desirable powder antiperspirant with improved suspension characteristics results.

EXAMPLE VI

To demonstrate the enhanced suspension characteristics made possible by the process and resulting composition of the present invention, an antiperspirant composition was prepared utilizing a conventional suspending agent and process of preparation as follows:

0.67 grams of distilled water were added to 12.83 grams of ethanol (SDA No. 40) in a 50 ml. beaker. 1.0 gram of citric acid monohydrate was then dissolved in the aqueous ethanol solution. This solution, along with 400 grams of dibutyl phthalate and 30 grams of Bentone-38, was placed in an Osterizer and mixed at "liquefy" speed for about 1 minute. 250 grams of a complex of aluminum hydroxychloride/zirconium hydroxychloride, 5 grams of hexachlorophene and 10 grams of perfume were then added and the mixture mixed an additional 15 seconds. 22 grams of the resulting mixture were placed in a Wheaton plastic-coated glass aerosol bottle. 120 grams of propellant 11/12 (60/40) mixture were pressure filled into the bottle. The bottle was shaken and allowed to set undisturbed for 24 hours. When measured 24 hours later, the suspension height was 30 percent.

When compared with similar compositions embodying the compositions and process of the present invention as prepared in Examples III-V, the significantly enhanced suspension levels made possible by the process and compositions of the present invention are readily apparent.

What is claimed is:

1. A process for the preparation of a propellant containing suspending agent composition for use in powder aerosol compositions, which process comprises:

A. Combining in a suitable container:
   1. from about 0.1 percent to about 3 percent by weight of a bulking agent selected from the group consisting of montmorillonite clays and hydrophobically treated montmorillonite clays;
   2. the balance of an anhydrous liquefied propellant selected from the group consisting of hydrocarbons, fluorohydrocarbons, and chlorofluorohydrocarbons and mixtures thereof;
   3. a polar liquid selected from the group consisting of ethanol, methanol, and propylene carbonate in an amount of from about 0.33:1 to about 0.45:1 of polar liquid to amount of bulking agent;

B. Subjecting said combination to high shear mixing for a period of time sufficient to achieve a uniform dispersion of the bulking agent; and C. Placing said combination in an aerosol container.

2. The process of claim 1 wherein the polar liquid is ethanol present in a ratio of about 0.45:1 to the amount of bulking agent.

3. The process of claim 1 wherein the bulking agent is a hydrophobically treated montmorillonite clay.

4. The process of claim 3 wherein the hydrophobically treated montmorillonite clay is selected from the group consisting of Bentone-38, Bentone-34, Bentone-27, Bentone-14, and Bentone-LT.

5. The process of claim 3 wherein the hydrophobically treated montmorillonite clay is Bentone-38 present in an amount of about 1.5 percent by weight.

6. The process of claim 1 wherein the anhydrous, liquefied propellant is selected from the group consisting of trichloromonofluoromethane, dichlorodifluoromethane, dichlorotetrafluoroethane, monochlorodifluoromethane, monochlorodifluoroethane, trichlorotrifluoroethane, propane, butane, isobutane, 1,1-difluoroethane, 1,1-difluoro-1-chloroethane, dichlorofluoromethane, methylene chloride, and mixtures thereof.

7. The process of claim 6 wherein the anhydrous, liquefied propellant is selected from the group consisting of trichloromonofluoroethane, dichlorotetrafluoroethane, and trichloromonofluoromethane and mixtures thereof.

8. The process of claim 7 wherein the anhydrous, liquefied propellant is trichloromonofluoromethane.

9. The propellant containing suspending agent composition prepared by the process of claim 1.

* * * * *